(12) United States Patent
Forslund et al.

(10) Patent No.: US 9,158,978 B2
(45) Date of Patent: Oct. 13, 2015

(54) VEHICLE ENVIRONMENT CLASSIFYING SAFETY SYSTEM FOR A MOTOR VEHICLE

(75) Inventors: David Forslund, Linkoping (SE); Per Cronvall, Linkoping (SE); Fredrik Tjarnstrom, Linkoping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 347 days.

(21) Appl. No.: 13/140,709

(22) PCT Filed: Jan. 19, 2010

(86) PCT No.: PCT/EP2010/000261
§ 371 (c)(1),
(2), (4) Date: Jun. 17, 2011

(87) PCT Pub. No.: WO2010/086100
PCT Pub. Date: Aug. 5, 2010

(65) Prior Publication Data
US 2011/0249119 A1    Oct. 13, 2011

(30) Foreign Application Priority Data
Jan. 30, 2009  (EP) ..................................... 09001313

(51) Int. Cl.
H04N 7/18     (2006.01)
G06K 9/00     (2006.01)
B60R 21/0134  (2006.01)
B60R 21/01    (2006.01)

(52) U.S. Cl.
CPC ........ G06K 9/00805 (2013.01); B60R 21/0134 (2013.01); G06K 9/00697 (2013.01); B60R 2021/01068 (2013.01)

(58) Field of Classification Search
None
See application file for complete search history.

(56) References Cited

U.S. PATENT DOCUMENTS

| 5,638,790 | A * | 6/1997 | Minowa et al. ................ 123/436 |
| 5,969,593 | A * | 10/1999 | Will ............................. 340/384.2 |
| 6,161,071 | A * | 12/2000 | Shuman et al. .................. 701/48 |
| 8,077,995 | B1 * | 12/2011 | Terre et al. ...................... 382/254 |
| 2004/0106372 | A1 * | 6/2004 | Andersson et al. .......... 455/3.02 |
| 2005/0075829 | A1 * | 4/2005 | Polimadei ...................... 702/165 |
| 2005/0276450 | A1 * | 12/2005 | Taniguchi et al. ............ 382/104 |

(Continued)

FOREIGN PATENT DOCUMENTS

| DE | 10 2007 022 939 A1 | 11/2007 |
| EP | 1 898 232 A1 | 3/2008 |
| WO | WO 2005/082681 A1 | 9/2005 |

OTHER PUBLICATIONS

PCT/EP2010/000261—International Search Report—Mar. 22, 2010.

*Primary Examiner* — Christopher S Kelley
*Assistant Examiner* — Kaitlin A Retallick
(74) *Attorney, Agent, or Firm* — Brinks Gilson & Lione

(57) ABSTRACT

A safety system for a motor vehicle having a sensing arrangement (11) providing sensor signals related to the surrounding environment of the vehicle, at least one safety means (13, 14, 15) for an occupant of the vehicle, and a control means (22) adapted to control the safety means (13, 14, 15) depending on signals from the sensing arrangement (11). The safety system (10) has an environment classifying means (23) adapted to classify the surrounding environment of the vehicle into different predetermined categories on the basis of signals from the sensing arrangement (11), and to adjust the control means (22) depending on the vehicle environment category determined by the environment classifying means (23).

12 Claims, 2 Drawing Sheets

(56) References Cited

U.S. PATENT DOCUMENTS

| | | | |
|---|---|---|---|
| 2008/0130954 A1* | 6/2008 | Taniguchi et al. | 382/104 |
| 2008/0258884 A1* | 10/2008 | Schmitz | 340/425.5 |
| 2008/0319670 A1* | 12/2008 | Yopp et al. | 701/301 |
| 2009/0021581 A1* | 1/2009 | Sun et al. | 348/148 |
| 2010/0023182 A1* | 1/2010 | Huang et al. | 701/1 |
| 2010/0316255 A1* | 12/2010 | Mathony et al. | 382/103 |
| 2013/0016209 A1* | 1/2013 | Taylor et al. | 348/118 |
| 2013/0113935 A1* | 5/2013 | Naik et al. | 348/148 |

* cited by examiner

VEHICLE ENVIRONMENT CLASSIFYING SAFETY SYSTEM FOR A MOTOR VEHICLE

This application claims priority to European Patent Application No. 09001313.7, filed Jan. 30, 2009, and PCT/EP2010/000261, filed Jan. 19, 2010.

FIELD OF THE INVENTION

The invention relates to a safety system for a motor vehicle, comprising a sensing arrangement providing sensor signals related to the surrounding environment of the vehicle, at least one safety means for an occupant of the vehicle, and a control means adapted to control said safety means depending on signals from said sensing arrangement.

BACKGROUND OF THE INVENTION

In safety systems for motor vehicles, means for detecting subjects in front of the vehicle, for example pedestrians, bicyclists and/or animals, are known. However, such detection means are still susceptible to false detections which cause irritations of the driver and, more important, a user disbelief in the safety system, and, even more seriously, missed detections causing the system to fail to warn the driver. Furthermore, such detection means generally consume large processing capacities which is one reason for limited detection reliability.

The object of the invention is to provide a safety system for a motor vehicle with a high detection reliability and reduced probability of false detections.

In accordance with this invention, the classification of the surrounding vehicle environment into different categories allows adjusting the safety system depending on the determined vehicle environment. In particular, an algorithm for detecting a subject in front of the car may be optimally chosen or adjusted depending on the detected vehicle environment which leads to an increased detection reliability and less false detections. Furthermore, the invention allows the deactivation of algorithms in the control means which are considered irrelevant for the determined vehicle environment, which contributes to an effective use of processing resources and thereby to increased detection reliability.

The different predetermined categories of vehicle environment may comprise city environment, non-city environment, rural environment, highway environment, etc. Also sub-categories of these categories are possible. Preferably the environment classifying means is adapted to classify the vehicle environment at least into a city environment and a non-city environment.

Preferably the safety means is adapted to provide safety-related information to a vehicle occupant. A particular advantageous application of the invention relates to providing an animal warning to a vehicle occupant if an animal is detected in front of the vehicle. In such application, the environment classifying means is preferably adapted to determine a city environment of the vehicle. The animal detection means of said safety system is then preferably deactivated if a city environment is determined by the environment classifying means, because the probability of vehicle-animal collisions is assumed to be zero in a city environment. As a result, any false detection of a wild animal in a city environment is prevented. Furthermore, the processing resources saved due to deactivation of animal detection can be assigned to other processes, for example pedestrian detection, the reliability of which can thereby be further enhanced.

Furthermore, the environment classifying means is preferably adapted to determine a rural or non-city environment of the vehicle. The animal detection means of said safety system is then preferably activated if a rural or non-city environment is determined by said environment classifying means.

Other predetermined states than complete animal warning deactivation and activation may be selectable in the control means. In general, the control means is adjustable to one of a plurality of predetermined states depending on the determined vehicle environment.

In a preferred embodiment the environment category is determined on the basis of image data provided by an imaging means of said sensing arrangement. The imaging means may comprise one or a plurality of cameras directed to the area in front of the vehicle, in particular optical or infrared cameras. The vehicle environment category may then be determined from the detected image by using image analysis techniques, for example pattern recognition techniques which are known in principle in the art. Other methods for distinguishing between the predetermined vehicle environment categories may be employed.

The environment category may also be determined on the basis of vehicle data provided by one or more vehicle mounted sensors, for example the vehicle speed and/or yaw rate. For determining a city environment, for example, the fact may be used that the vehicle in the average travels slower and/or with a higher probability of turning in a city environment. Therefore, using the known velocity and/or yaw rate from a past time window classification of the vehicle environment into a city or non-city environment is possible.

In a particularly preferred embodiment of this invention, a combination of image data provided by an imaging means and vehicle data provided by at least one of vehicle sensor is used to determine the environment category. For example the image data may be used to determine the environment category and the vehicle data may then be used to confirm the detected environment category, which enhances the reliability of the detected vehicle environment category.

BRIEF DESCRIPTION OF THE DRAWINGS

In the following the invention shall be illustrated on the basis of preferred embodiments with reference to the accompanying drawings, in which.

DETAILED DESCRIPTION OF THE INVENTION

Figure 1:
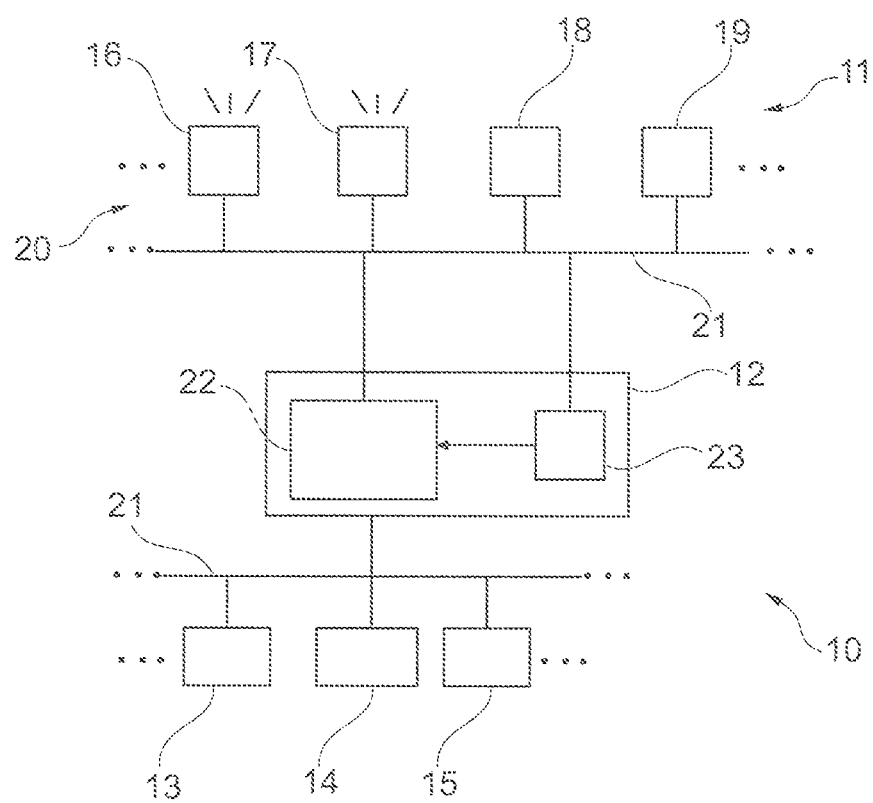
FIG. 1 shows a schematic representation of a safety system.

The safety system 10 is mounted in a motor vehicle and comprises a sensing arrangement 11, an electronic processing means 12 and a plurality of safety means 13, 14, and 15, (many more can be provided, as designated in FIG. 1 by . . . ) for a vehicle occupant, for example pretensioner means 13, airbag means 14, animal warning means 15, and the like.

The sensing arrangement 11 preferably comprises an imaging means 20 arranged to record an image of a region in front of the vehicle, and vehicle sensors 18 and 19 (many more can be provided, as designated in FIG. 1 by . . . ) arranged to produce data related to the movement of the vehicle, for example a yaw sensor 18, a speed sensor 19, and other vehicle mounted sensing means. The sensing arrangement 11 may comprise other sensors like a radar sensor arrangement. The imaging means 20 may be an optical and/or infrared imaging means, where infrared covers near IR and/or far IR. Preferably the imaging means 20 comprises a camera arrangement, here in the form of stereo cameras 16, 17.

The programmable electronic processing means 12 preferably comprises a microprocessor or microcontroller, and may be realized for example in a vehicle mounted electronic control unit ECU. The sensing arrangement 11 and the safety means 13, 14, and 15 are connected to the electronic processing means 12 via a vehicle mounted data bus 21.

The processing means 12 comprises a control means 22 adapted to process signals received from the sensor arrangement 11 and to control the safety means 13, 14, and 15 depending on the processing result. For example a pretensioner means 13 and/or an airbag means 14 may be activated by the control means 22 when a pre-impact situation and/or an impact situation is determined on the basis of signals from corresponding (pre-)impact sensors of the sensing arrangement 11. The control means 22 is preferably realized by software.

The processing means 12 furthermore comprises an environment classifying means 23, preferably also realized by software, which is adapted to process signals received from the sensor arrangement 11 and to adjust the control means 22 depending on the processing result as indicated in FIG. 1 by an arrow. In particular the environment classifying means 23 is adapted to determine the sort or category of surrounding environment in which the vehicle moves. More specifically a model, or a plurality of models, for a predetermined plurality of possible environment categories EC1, EC2, ECn are pre-stored in the environment classifying means 23.

Figure 2:
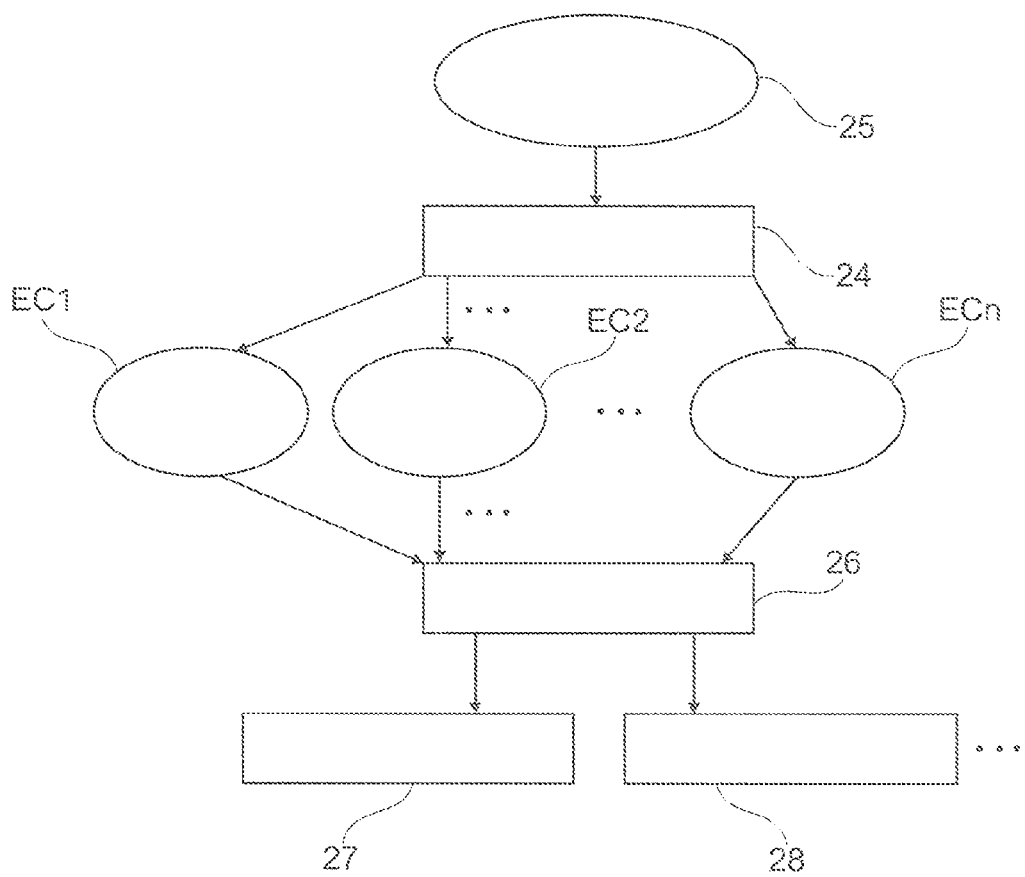
FIG. 2 shows a process diagram for the environmental classifying means of FIG. 1.

Now with reference to FIG. 2, the environment classifying means 23 comprises an environment classifier 24 which processes environment related data 25 received from the sensor arrangement 11 in order to classify the current vehicle environment into one of the predetermined environment categories EC1, EC2, ECn by assigning a closeness measure between each predetermined environment category EC1, EC2, ECn and the current environment related data 25. For example the environment classifier 24 may calculate for a current set of environment related data 25 the probability that the current vehicle environment falls into each of the predetermined environment categories EC1, EC2, ECn, and then determines the predetermined environment category with the highest probability value to be the current environment category. In order to improve the classification reliability the environment classifier 24 may be adapted to perform, in real time, classification filtering over time by considering a weighted sum of several time consecutive classification results.

The environment classifying means 23 furthermore comprises a decision means 26 adapted to provide different adjustment signals to the control means 22 in order to set different predetermined states 27, and 28 (more are possible) in the control means depending on the determined environment category. In this manner the control software in the control means 22 for controlling the safety means 13, 14, and 15 can be optimally adjusted to the current vehicle environment.

The environment categories EC1, EC2, ECn may for example comprise city environment, non-city environment, highway environment, rural environment and/or other environment categories. In order to allow for the determination of the environment category the input data 25 for the environment classifying means 23 must be directly or indirectly related to the environment of the vehicle. In one embodiment data from a sensor of the sensor arrangement 11 directly sensing a region in front of the car is used as input data 25 for the environment classifying means 23. In particular this may be data from a camera system 20 or a radar sensor arrangement.

In another embodiment vehicle motion data from vehicle motion sensors 18, and 19 (more are possible, as designated in FIG. 1 by . . . ) like yaw sensor 18 and/or speed sensor 19, can be used as input data 25 for the environment classifying means 23. Such vehicle motion data is indirectly related to the environment of the vehicle because for example in a city environment vehicles usually move slower and with a higher probability of turning in comparison to a non-city environment.

In a preferred embodiment data from a sensor 20 directly sensing a region in front of the car and data from vehicle motion sensors 18, and 19 are used as input data 25 for the environment classifying means 23, which contributes to a higher classification reliability.

In the following a preferred application of the above-described features to an animal warning system is described. In this application the control means 22 is adapted to detect an animal in a region in front of the car, in particular a large animal like elk, deer, horse, cow etc. which forms a high risk in a collision with a vehicle, on the basis of image data provided by the imaging means 20. Technically this can be realized in principle in the same manner as pedestrian detection from imaging data.

When the control means 22 determines an animal in a region in front of the car which has a potential risk of colliding with the vehicle the control means 22 activates an animal warning means 15 which provides an animal warning to the driver. The animal warning may be of any suited form comprising an acoustical, optical and/or haptical warning signal, for example a flashing monitor, an alert sound and/or warning information displayed on the driver's display.

In a particularly preferred embodiment the environment classifying means 23 is adapted to categorize the current environment into two environment categories, namely city environment and non-city environment. In case a city environment is determined by the classifier 24 the decision means 26 sets the control means 22 into a state 27 where animal detection and animal warning are deactivated. This is based on the assumption that no large animals are present in a city environment. The processing resources which are connected with animal detection can be assigned to other processes like pedestrian detection which improves the reliability of the safety system.

On the other hand, in case a non-city environment and therefore an increased risk of large animals is determined by the classifier 24, the decision means 26 sets the control means 22 into a state 28 where animal detection and animal warning are activated. In this case the processing resources may be shared between pedestrian detection and animal detection.

As mentioned above, more than two environment categories may be determinable by the environment classifying means 23, and/or the environment classifying means 23 may set more than two states in the control means 22. For example if a highway environment is determined, pedestrian determination and warning may be deactivated and only animal detection and warning may be activated because it may be assumed that no pedestrians are present in a highway environment.

The process of environment classification and safety means control adjustment based on the determined environment is permanently repeated in real time during driving of the vehicle, with a frequency suited for duly detecting a change in the vehicle environment.

The invention is not limited to adjusting the control of an animal warning means depending on the determined vehicle environment. It also covers adjusting the control of any other vehicle occupant safety means, for example pretensioner and/or airbag means, depending on the determined vehicle environment. In general the term safety means covers occupant protecting means as well as occupant alerting means.

While the above description constitutes the preferred embodiment of the present invention, it will be appreciated that the invention is susceptible to modification, variation and change without departing from the proper scope and fair meaning of the accompanying claims.

The invention claimed is:

1. A safety system for a motor vehicle, comprising:
   a sensing arrangement providing sensor signals related to the surrounding environment of the vehicle and related to detection of an animal or a pedestrian;
   at least one safety means for providing enhancing safety for an occupant of the vehicle;
   a control means for controlling the safety means depending on the sensor signals from the sensing arrangement;
   an environment classifying means for classifying the surrounding environment of the vehicle into different predetermined categories on the basis of the sensor signals from the sensing arrangement and for adjusting the control means depending on the predetermined category classified by the environment classifying means, wherein the surrounding environment is the environment surrounding both the vehicle and either a road or highway in which the vehicle operates, wherein the environment includes the environment in which the road or highway is located;
   wherein, depending on the classified predetermined category, the control means is adjusted with respect to its control of the safety means in the event of the signals being related to the detection of an animal or a pedestrian;
   wherein the safety means is adapted to provide an animal or pedestrian warning, and the animal or pedestrian warning is deactivated depending on the predetermined category classified by the environment classifying means;
   wherein the environment classifying means is adapted to determine that the surrounding environment is a city environment and the city environment is a predetermined category;
   wherein the safety means is adapted to provide an animal warning and the animal warning is completely deactivated if the city environment is determined by the environment classifying means; and
   wherein the predetermined category is classified on the basis of yaw rate data provided by a yaw sensor of the sensing arrangement.

2. The safety system according to claim 1, wherein the safety means provides safety-related information to the occupant of a vehicle.

3. The safety system according to claim 1, wherein the sensor arrangement is adapted to provide the sensor signals related to detection of the animal or the pedestrian in front of the vehicle.

4. The safety system according to claim 3, wherein the safety means is adapted to provide an animal warning or the pedestrian warning to the vehicle occupant if the animal or the pedestrian is detected in front of the vehicle.

5. The safety system according to claim 1, wherein the environment classifying means is adapted to determine that the surrounding environment is a rural or non-city environment and the rural or non-city environment is a predetermined category.

6. The safety system according to claim 5, wherein the safety means is adapted to provide an animal warning and the animal warning is activated if the rural or non-city environment is determined by the environment classifying means.

7. The safety system according to claim 1, wherein the environment classifying means is further for performing classification filtering over time by considering a weighted sum of several time consecutive classification results.

8. The safety system according to claim 1, wherein the control means is adjustable to one of a plurality of predetermined states depending on the predetermined categories.

9. The safety system according to claim 1, wherein the predetermined category is classified on the basis of image data provided by an imaging means for imaging of the sensing arrangement.

10. The safety system according to claim 1, wherein the predetermined category is classified on the basis of vehicle data provided by at least one vehicle sensor of the sensing arrangement.

11. The safety system according to claim 1, wherein the predetermined category is classified on the basis of speed data provided by a speed sensor of the sensing arrangement.

12. The safety system according to claim 1, wherein the predetermined category is classified on the basis of a combination of image data provided by an imaging means and vehicle data provided by at least one vehicle sensor of the sensing arrangement.

* * * * *